United States Patent
Mouquet et al.

(10) Patent No.: US 12,022,341 B2
(45) Date of Patent: Jun. 25, 2024

(54) LATENCY-FREE INTERCELLULAR TRANSFER MANAGEMENT FOR A MULTIPLE-ATTACHMENT MOBILE TERMINAL

(71) Applicant: ORANGE, Issy-les-Moulineaux (FR)

(72) Inventors: Antoine Mouquet, Chatillon (FR); Xiaofeng Huang, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 297 days.

(21) Appl. No.: 17/294,901

(22) PCT Filed: Nov. 18, 2019

(86) PCT No.: PCT/FR2019/052735
§ 371 (c)(1),
(2) Date: May 18, 2021

(87) PCT Pub. No.: WO2020/104745
PCT Pub. Date: May 28, 2020

(65) Prior Publication Data
US 2022/0022108 A1    Jan. 20, 2022

(30) Foreign Application Priority Data
Nov. 19, 2018    (FR) ..................................... 1871686

(51) Int. Cl.
*H04W 36/08*    (2009.01)
*H04W 36/00*    (2009.01)

(52) U.S. Cl.
CPC ... *H04W 36/0079* (2018.08); *H04W 36/0027* (2013.01); *H04W 36/08* (2013.01)

(58) Field of Classification Search
CPC ......... H04W 36/0079; H04W 36/0027; H04W 36/08; H04W 28/082; H04W 28/0864;
(Continued)

(56) References Cited

U.S. PATENT DOCUMENTS 7,457,646 B2 * 11/2008  Mahany .................. H04L 45/00
                                                                455/574
10,506,487 B2   12/2019  Koodli et al.
(Continued)

FOREIGN PATENT DOCUMENTS

CA    2286300 C  *  6/2006  ............. H04B 7/022
CA    2910098 A1 *  5/2008  ........ H04W 12/0017
(Continued)

OTHER PUBLICATIONS

Kyocera. "Handover enhancements with dual connectivity". vol. RAN WG 2, No. Prague, Czech Republic; Feb. 10, 2014-Feb. 14, 2014, 3GPP Draft; R2-140698_DC_HO. (Year: 2014).*
(Continued)

*Primary Examiner* — Yuwen Pan
*Assistant Examiner* — Swati Jain
(74) *Attorney, Agent, or Firm* — David D. Brush; Westman, Champlin & Koehler, P.A.

(57) ABSTRACT

A method for multiple attachment of a mobile terminal to access points of a plurality of access points of at least one cellular network. The terminal is able to be attached simultaneously to a given number of different access points, called maximum number of attachments. The method is implemented by the terminal and includes: receiving a command to change access point, called handover command, from one access point of the plurality, called source access point; determining a number of handovers in progress; queuing the received handover command when a maximum number of handovers in progress is reached, this number depending on the maximum number of attachments, executing the received handover command when the maximum number of handovers in progress is not reached.

17 Claims, 3 Drawing Sheets

Figure 1:
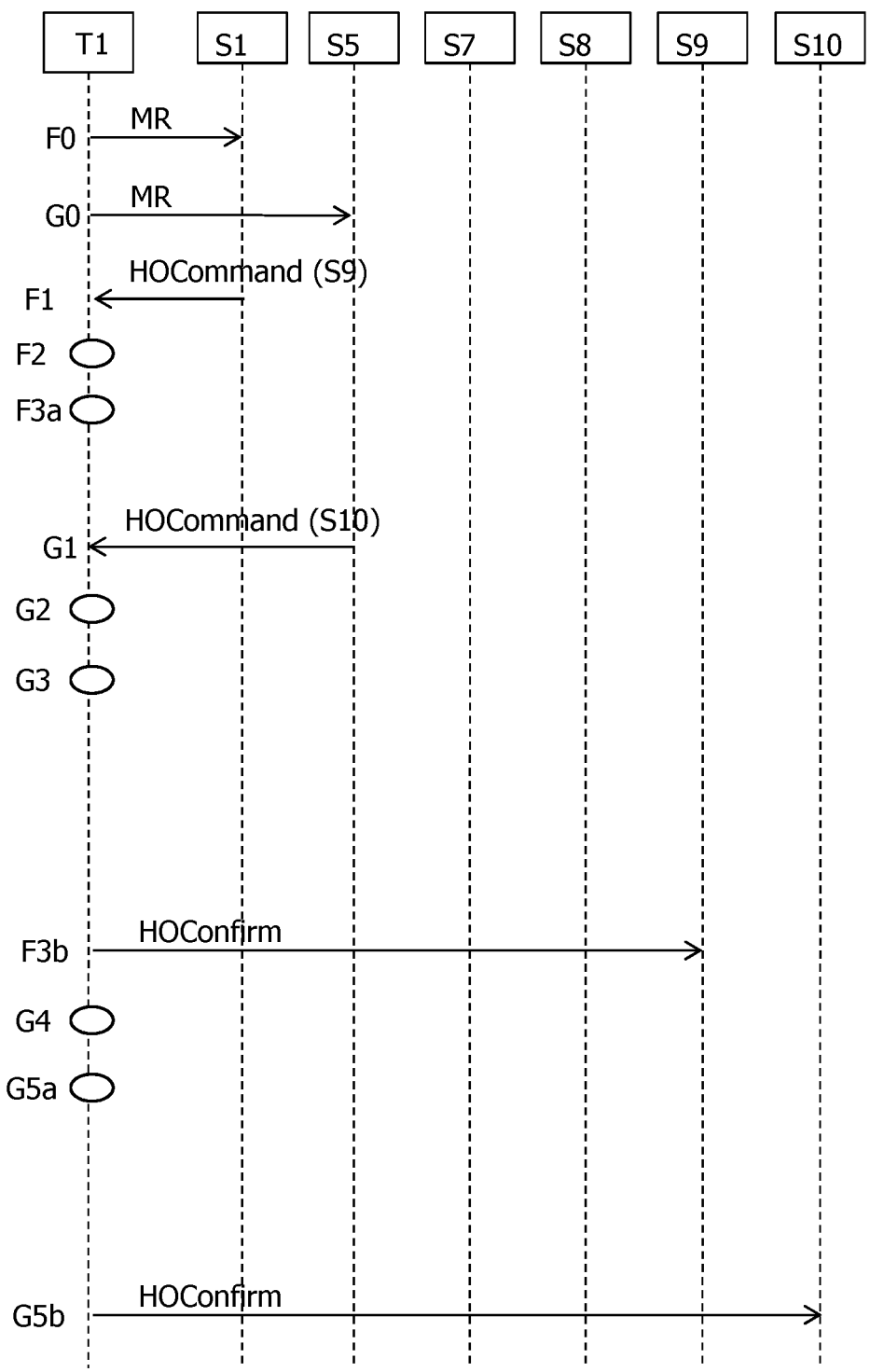

(58) Field of Classification Search
CPC ..... H04W 88/06; H04W 36/00; H04W 28/06; H04W 28/08; H04W 88/02

See application file for complete search history.

(56) References Cited

U.S. PATENT DOCUMENTS

| | | | | |
|---|---|---|---|---|
| 2010/0008291 | A1* | 1/2010 | LeBlanc | H04W 40/12 370/328 |
| 2010/0226339 | A1* | 9/2010 | Stephenson | H04W 24/08 370/332 |
| 2011/0222523 | A1* | 9/2011 | Fu | H04W 48/10 370/338 |
| 2014/0241317 | A1 | 8/2014 | Jamadagni et al. | |
| 2014/0355565 | A1* | 12/2014 | Hayes | H04W 36/245 370/331 |
| 2015/0045028 | A1* | 2/2015 | Singh | H04W 36/0079 455/436 |
| 2016/0337925 | A1 | 11/2016 | Fujishiro et al. | |
| 2017/0223593 | A1* | 8/2017 | Koodli | H04W 36/18 |
| 2019/0110236 | A1* | 4/2019 | Huang | H04W 36/0027 |
| 2019/0230500 | A1* | 7/2019 | Gonçalves | H04W 36/14 |
| 2022/0182902 | A1* | 6/2022 | Decarreau | H04B 7/0617 |

FOREIGN PATENT DOCUMENTS

| | | | | |
|---|---|---|---|---|
| CA | 2779836 | A1 * | 5/2011 | ............ H04W 36/22 |
| EP | 3051876 | A1 * | 8/2016 | ........ H04W 36/0058 |
| EP | 3051876 | A1 | 8/2016 | |
| EP | 3384705 | A1 | 10/2018 | |
| WO | WO-2006012909 | A1 * | 2/2006 | ........ H04W 36/0083 |
| WO | 2017131905 | A1 | 8/2017 | |

OTHER PUBLICATIONS

International Search Report dated Apr. 1, 2020 for corresponding International Application No. PCT/FR2019/052735, dated Nov. 18, 2019.

Written Opinion of the International Searching Authority dated Apr. 1, 2020 for corresponding International Application No. PCT/FR2019/052735, filed Nov. 18, 2019.

English translation of the Written Opinion of the International Searching Authority dated Jul. 3, 2020 for corresponding International Application No. PCT/FR2019/052735, filed Nov. 18, 2019.

* cited by examiner

LATENCY-FREE INTERCELLULAR TRANSFER MANAGEMENT FOR A MULTIPLE-ATTACHMENT MOBILE TERMINAL

CROSS-REFERENCE TO RELATED APPLICATIONS

This Application is a Section 371 National Stage Application of International Application No. PCT/FR2019/052735, filed Nov. 18, 2019, which is incorporated by reference in its entirety and published as WO 2020/104745 A2 on May 28, 2020, not in English.

1. FIELD OF THE INVENTION

The invention relates to the field of cellular networks and more particularly that of the availability rate of a telecommunications service through the attachment of a mobile terminal to a plurality of access points of a cellular network at the same time.

2. PRIOR ART

One conventional way of increasing the availability rate of telecommunications services is that of performing multiple attachment of the terminal installation to the network. With regard to cellular networks, there are mobile terminals that are capable of performing dual attachment to one or more mobile access networks; these are typically terminals with two SIM cards.

However, the attachment point of a mobile terminal to the network is liable to change at any time.

When a mobile terminal attached simultaneously to two base stations receives an inter-cell transfer command, called a "handover" command, that impacts its first attachment, and then another handover command that impacts its second attachment, while the first handover has not yet been completed, the connectivity interruption inherent to handovers risks causing the terminal to lose all connectivity with a base station. This loss of connectivity, even for the brief time that a handover lasts, may be problematic for applications requiring very low latency or very low jitter.

One of the aims of the invention is to rectify these drawbacks from the prior art.

3. DISCLOSURE OF THE INVENTION

The invention aims to improve the situation using a method for the multiple attachment of a mobile terminal to access points of a plurality of access points of at least one cellular network, the terminal being able to be attached simultaneously to a given number of different access points, called maximum number of attachments, the method being implemented by the terminal and comprising the following steps:
  receiving an access point change command, called handover command, from one access point of the plurality, called source access point,
  determining a number of handovers in progress,
  putting the received handover command on hold when a maximum number of handovers in progress is reached, this number being dependent on the maximum number of attachments,
  executing the received handover command when the maximum number of handovers in progress is not reached.

The attachment of a terminal to an access point may comprise an initial phase of inter-cell transfer between an access point of a source cell and an access point of a target cell, called "handover". When a handover is decided, that is to say when the terminal receives, from the source access point, a handover command to hand over to the target access point, it may be the case that some or all of the other attachment(s) of the terminal are still in their handover phase.

By virtue of the proposed method, the terminal never stops being connected, even when it only has one attachment remaining that is not in the process of being handed over when it receives a new handover command.

Specifically, for as long as the terminal is in this situation, it delays the handover to the target access point from the source access point to which the terminal is still attached. This guarantees a connection between the terminal and at least one access point for as long as the other attachments of the terminal have not left their own handover phase.

According to one aspect of the attachment method, the execution step comprises, at the start thereof, a step of incrementing a counter for counting handovers in progress, and a step of decrementing said counter at the end thereof, and wherein the determination step comprises a step of consulting said counter.

By virtue of the counter, the number of handovers in progress is updated in real time.

According to one aspect of the attachment method, the putting on hold step comprises transmitting a handover rejection message to the source access point.

However, the delaying of the handover by the terminal exhibits a risk, specifically that of the source access point cutting the connection after having transmitted the handover command. By virtue of the handover rejection message, the source access point is informed rapidly and may refrain from cutting the connection, and transmit a new handover command to the terminal later on, if necessary after having selected a new target access point if for example the radio conditions have changed for the terminal during the short period of time that has elapsed since it transmitted the handover command that was rejected by the terminal.

According to one aspect of the attachment method, the counter for counting handovers in progress comprises, for each handover in progress, an expected end time, and wherein the rejection message furthermore contains the expected end time of the counter that is the closest in time.

In spite of everything, there is still a risk that the source access point will transmit its new handover command too early for the terminal, and that none of the handovers in progress have yet been completed when the terminal receives the new handover command.

By virtue of the expected end time, the source access point receiving the rejection message waits for the expected end time indicated in the message before sending a new handover command, and thus avoids prematurely and needlessly sending a handover command that would be rejected again by the terminal.

The various aspects of the attachment method that have just been described are able to be implemented independently of one another or in combination with one another.

The invention also relates to a method for selecting an access point for the multiple attachment of a mobile terminal to access points of a plurality of access points of at least one cellular network, the method being implemented by one of the access points of the plurality, called source access point, and comprising the following steps:

receiving a message, called measurement report, from the terminal and containing measurements relating to radio signals transmitted by access points of the plurality, selecting an access point for the terminal from among the plurality, called target access point, at least on the basis of the received measurement report, transmitting to the terminal an access point change command, called handover command, to hand over from the source access point to the target access point, receiving a handover rejection message from the terminal.

Following the selection of a target access point, the source access point triggers the handover of the terminal to the target access point by sending it a handover command. If the terminal is then in the process of being handed over on all of its attachments apart from one, a new handover on this last attachment causes it to lose its connectivity with all of its access points. By virtue of the rejection message, the source access point is informed that the handover that it has scheduled will not be executed by the terminal. It may then cancel it, which will allow a new handover command to be transmitted at a later time.

According to one aspect of the selection method, the rejection message comprises an expected end time of a handover in progress.

By virtue of the information relating to an end time of a handover in progress, the access point may then wait for this end time to transmit its new handover command, and thus increase the chances that the terminal will execute it. In addition, the source access point may, during the wait, select another target access point if the conditions have changed, for example if the terminal has transmitted a new measurement report in the meantime.

The invention also relates to a device for the multiple attachment of a mobile terminal to access points of a plurality of access points of at least one cellular network, the terminal being able to be attached simultaneously to a given number of different access points, called maximum number of attachments, the device comprising a receiver, a transmitter, a processor and a memory coupled to the processor with instructions intended to be executed by the processor in order to:

receive an access point change command, called handover command, from one access point of the plurality, called source access point, determine a number of handovers in progress, put the received handover command on hold when a maximum number of handovers in progress is reached, this number being dependent on the maximum number of attachments, execute the received handover command when the maximum number of handovers in progress is not reached.

This device, which, according to one aspect, may comprise a counter for counting handovers in progress, is able, in all of its embodiments, to implement the attachment method that has just been described, and is intended to be implemented in a mobile terminal.

The invention also relates to a device for selecting an access point for the multiple attachment of a mobile terminal to access points of a plurality of access points of at least one cellular network, the device comprising a receiver, a transmitter, a processor and a memory coupled to the processor with instructions intended to be executed by the processor in order to:

receive a message, called measurement report, from the terminal and containing measurements relating to radio signals transmitted by access points of the plurality, select an access point for the terminal from among the plurality, called target access point, at least on the basis of the received measurement report, transmit to the terminal an access point change command, called handover command, to hand over from a source access point to the target access point, receive a handover rejection message from the terminal.

This device, which, according to one aspect, may furthermore comprise a retarder for delaying a new handover command to the terminal, after receiving a rejection message from the terminal, is able, in all of its embodiments, to implement the selection method that has just been described, and is intended to be implemented in an access point to a cellular network, or base station.

The invention also relates to a computer program comprising instructions for implementing the steps of the attachment method that has just been described when this program is executed by a processor. The invention also targets an information medium able to be read by a mobile terminal and containing instructions of a computer program as mentioned above.

The invention also relates to a computer program comprising instructions for implementing the steps of the selection method that has just been described when this program is executed by a processor. The invention also targets an information medium able to be read by an access point to a cellular network and containing instructions of a computer program as mentioned above.

The abovementioned programs may use any programming language, and be in the form of source code, object code, or of intermediate code between source code and object code, such as in a partially compiled form, or in any other desirable form.

The abovementioned information media may be any entity or device capable of storing the program. For example, a medium may include a storage means, such as a ROM, for example a CD-ROM or a microelectronic circuit ROM, or else a magnetic recording means.

Such a storage means may be for example a hard disk, a flash memory, etc.

Moreover, an information medium may be a transmissible medium such as an electrical or optical signal, which may be routed via an electrical or optical cable, by radio or by other means. A program according to the invention may in particular be downloaded from an Internet network.

Alternatively, an information medium may be an integrated circuit in which a program is incorporated, the circuit being designed to execute or to be used in the execution of the methods in question.

4. PRESENTATION OF THE FIGURES

Figure 2:
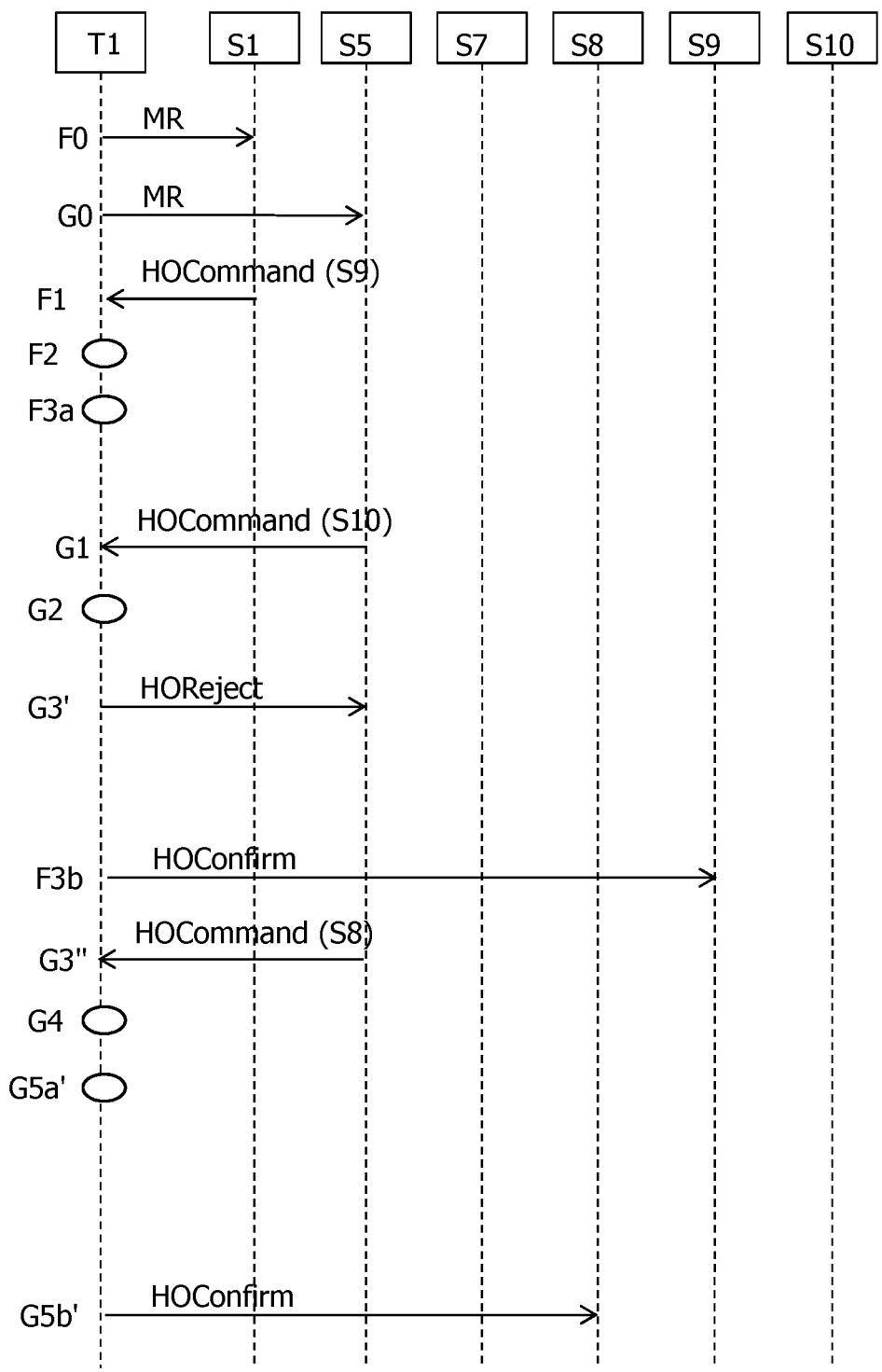
Figure 3:
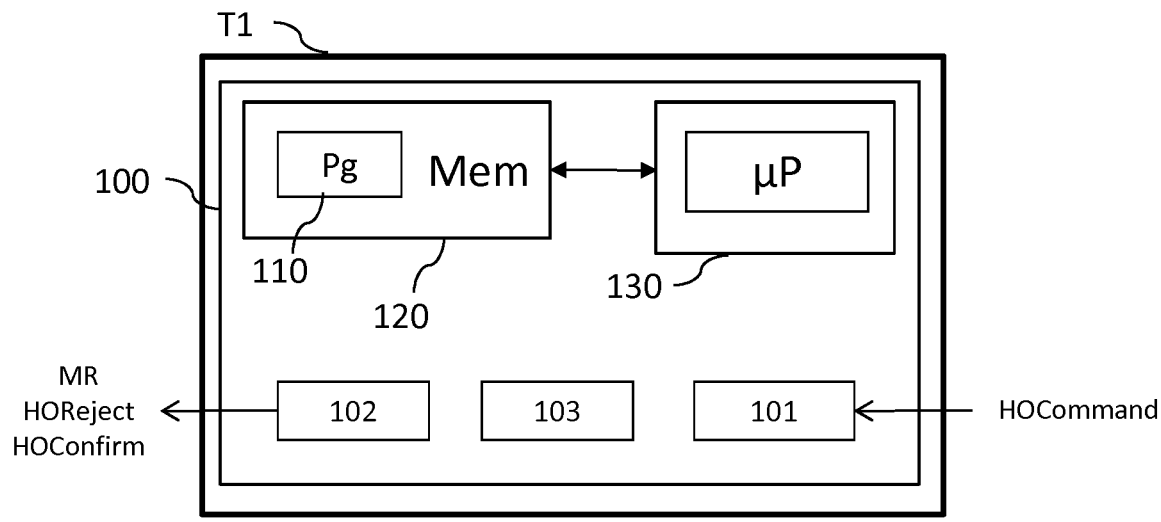
Figure 4:
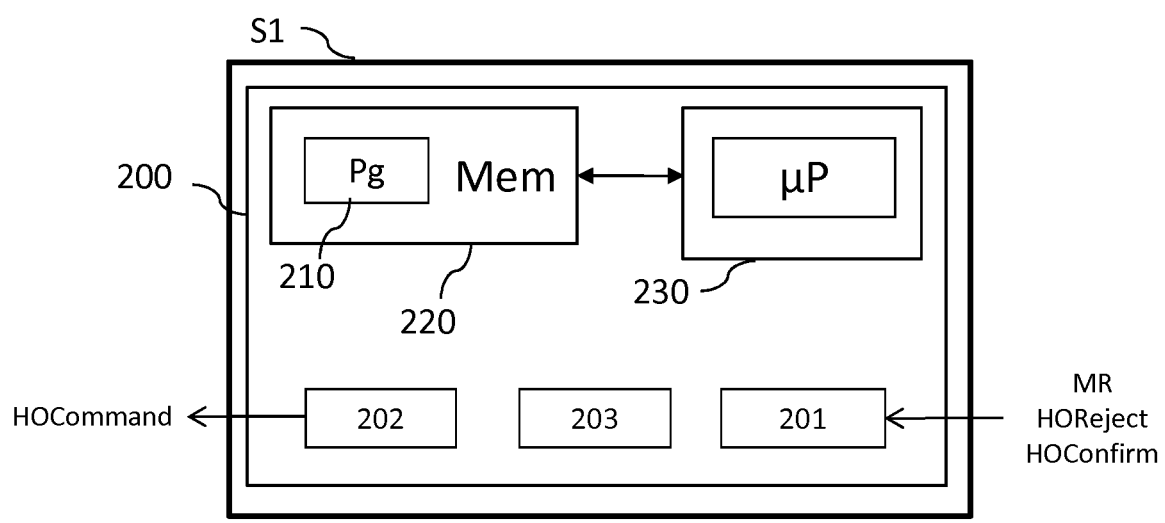

Other advantages and features of the invention will become more clearly apparent from reading the following description of one particular embodiment of the invention, given by way of simple illustrative and non-limiting example, and the appended drawings, in which:

FIG. 1 shows a flow diagram corresponding to the methods for the multiple attachment of a mobile terminal and for selecting an access point for the multiple attachment of a mobile terminal, according to one aspect of the invention, FIG. 2 shows a flow diagram corresponding to the methods for the multiple attachment of a mobile terminal and for selecting an access point for the multiple attachment of a mobile terminal, according to another aspect of the invention, FIG. 3 shows the structure of a device for the multiple attachment of a mobile terminal according to one aspect of the invention, FIG. 4 shows the structure of a device for selecting an access point for the multiple attachment of a mobile terminal according to one aspect of the invention.

5. DETAILED DESCRIPTION OF AT LEAST ONE EMBODIMENT OF THE INVENTION

The remainder of the description presents examples of a plurality of embodiments of the invention based on a dual attachment of a mobile terminal to base stations of a cellular network connected to a core network, but the invention also applies to other configurations, such as more than two attachments of one and the same terminal to base stations of a plurality of cellular networks, connected to a plurality of core networks, etc. The invention is applicable to all types of cellular network, for example fourth-generation or fifth-generation 3GGP networks, called 4G or 5G, or even beyond. The access points, or base stations, may for example be eNBs or gNBs according to 3GPP terminology.

FIG. 1 shows a flow diagram corresponding to the methods for the multiple attachment of a mobile terminal and for selecting an access point for the multiple attachment of a mobile terminal, according to one aspect of the invention.

In this particular embodiment of the invention, the procedure of handing over from a source access point (source base station) to a target access point (target base station) is delayed if the terminal is in the process of being handed over to a different pair of access points.

The terminal T1 is a dual-attachment terminal, attached initially both to the base station S1 and to the base station S5. In preliminary steps F0 and G0, in accordance with a known technique, the terminal T1 transmits to its access points S1 and S5 a measurement report MR, containing radio signal strength measurements performed by the terminal T1 on the signals received from base stations within whose coverage it is located. These measurement reports are transmitted by the terminal T1 repeatedly to the access points to which it is attached, but only one instance is illustrated for the sake of simplicity.

In accordance with a known technique, after having determined, on the basis of the last received measurement report, that it is no longer the optimum base station for the terminal T1, the base station S1 selects a target base station (S9 in our example) and transmits, in a step F1, a Handover Command message to the terminal T1, commanding it to perform a handover to the target base station.

In a step F2, the terminal T1 determines that no handover is already in progress, since its attachment to the base station S5 is not subject to a handover command currently being processed. In one variant that is particularly useful in the case of terminals capable of attaching simultaneously to a large number of access points (at least equal to 2), the terminal has a counter for counting handovers in progress, initialized to 0 when no handover is in progress. To determine the number of handovers in progress, the terminal simply has to consult this counter.

In a step F3a, the terminal T1 therefore starts to execute the handover from the source access point (the base station S1) to the target access point (the base station S9). If it has a counter for counting handovers in progress, the terminal T1 increments it by 1.

In accordance with a known technique, after having determined, on the basis of the last received measurement report, that it is no longer the optimum base station for the terminal T1, the base station S5 selects a target base station (S10 in our example) and transmits, in a step G1, a Handover Command message to the terminal T1, commanding it to perform a handover to the target base station.

In a step G2, the terminal T1 determines that a handover is already in progress, since its attachment to the base station S1 is subject to a handover command and is currently being processed. If it has a counter for counting handovers in progress, the terminal T1 may perform this determination by consulting it and noting that it indicates the value of 1, which is the maximum authorized for a terminal with 2 possible attachments.

According to the invention, the maximum authorized number of handovers in progress for a terminal with N possible attachments is N−1.

The terminal T1 is therefore in a situation where, if it were to execute the second handover command, all of its attachments (respectively to the base station S1 and to the base station S5) would at the same time be in the process of being handed over, which would interrupt the connectivity of the terminal to the network. In order to avoid this situation, in a step G3, the terminal T1 puts the handover command received in step G1 on hold.

In a step F3b, the terminal T1 ends the handover from the source access point (the base station S1) to the target access point (the base station S9), and it transmits a handover confirmation message to the base station S9. If it has a counter for counting handovers in progress, the terminal T1 decrements it by 1.

In a step G4, the terminal T1 determines that a handover is no longer in progress. If it has a counter for counting handovers in progress, the terminal T1 may perform this determination by consulting it and noting that it indicates the value of 0, which is lower than 1, the maximum authorized number of handovers for the terminal T1.

In a step G5a, the terminal T1 leaves the state of putting the second handover on hold and starts to execute the second handover from the source access point (the base station S5) to the target access point (the station base S10). If it has a counter for counting handovers in progress, the terminal T1 increments it by 1.

Finally, in a step G5b, the terminal T1 ends the second handover from the source access point (the base station S5) to the target access point (the base station S10), and it transmits a handover confirmation message to the base station S10. If it has a counter for counting handovers in progress, the terminal T1 decrements it by 1.

FIG. 2 shows a flow diagram corresponding to the methods for the multiple attachment of a mobile terminal and for selecting an access point for the multiple attachment of a mobile terminal, according to another aspect of the invention.

In this particular embodiment of the invention, the procedure of handing over from a source access point (source base station) to a target access point (target base station) is not only delayed if the terminal is in the process of being handed over to a different pair of access points, but the terminal informs the source access point of this.

The steps from F0 to G2 are identical to those described with reference to FIG. 1. Step G3 is replaced with a step G3', wherein putting the second handover on hold comprises transmitting a handover rejection message, from the terminal T1 to the source access point (the base station S5).

The access point receiving a handover rejection message may then respond in several ways, depending on the meaning given to the rejection message.

In a first alternative, the rejection message means that the access point cannot immediately execute the handover but that it will execute it later on. The access point then knows that the terminal will execute the commanded handover later. It therefore also knows that it should not cut the connection with the terminal until this handover is executed. In this first alternative, the steps following step G3' are steps F3b to G5b, already described with reference to FIG. 1.

In a second alternative, the rejection message means that the access point will not execute this handover. In this case, the source access point cancels the handover that is the subject of the rejected command, and restarts a new handover procedure, possibly taking into account the most recent measurement report or reports received from the terminal, thereby possibly changing the selection of the target access point.

In this second alternative, there is still a risk of the access point transmitting a new handover command too quickly, that is to say while the terminal is still in a situation where it cannot start a new handover without risking losing its connectivity with all of its access points. In this case, the terminal will transmit a new rejection message.

For the sake of simplicity, it is assumed that the access point transmits its new handover command at a time when the terminal is able to perform it, that is to say after step F3b. After having again determined, on the basis of the last received measurement report, that it is not the optimum base station for the terminal T1, the base station S5 selects a target base station (S8 in our example) and transmits, in a step G3", a new Handover Command message to the terminal T1, commanding it to perform a handover to the target base station, which is the base station S8 (and no longer to the base station S10 as in step G1). This change in target base station may for example be due to a movement of the terminal T1 that causes it to move away from the base station S10 and approach the base station S8.

Next, in a step G4 identical to that of FIG. 1, the terminal T1 determines that a handover is no longer in progress. If it has a counter for counting handovers in progress, the terminal T1 may perform this determination by consulting it and noting that it indicates the value of 0, which is lower than 1, the maximum authorized number of handovers for the terminal T1.

In a step G5a', the terminal T1 starts to execute the new handover from the source access point (the base station S5) to the target access point (the base station S8). If it has a counter for counting handovers in progress, the terminal T1 increments it by 1.

Finally, in a step G5b', the terminal T1 ends the second handover from the source access point (the base station S5) to the target access point (the base station S8), and it transmits a handover confirmation message to the base station S8. If it has a counter for counting handovers in progress, the terminal T1 decrements it by 1.

In a third alternative, the rejection message means that the access point will not execute this handover, but it contains additional information: the estimated end time of a handover in progress (or that of the handover in progress ending the earliest if several handovers are in progress). In this case, just as in the second alternative, the source access point cancels the handover that is the subject of the rejected command, and restarts a new handover procedure, possibly taking into account the most recent measurement report or reports received from the terminal, thereby possibly changing the selection of the target access point. Unlike the second alternative, however, it waits for the end time indicated in the rejection message before transmitting its new handover command. It is thus certain that this new handover command will not be rejected. The risk of the access point retransmitting a new handover command too quickly is eliminated. For this third alternative, if the terminal has a counter for counting handovers in progress, this counter comprises, for each handover in progress, an expected end time, for example estimated by the terminal. When the terminal transmits its rejection message (step G3'), if the counter indicates several handovers in progress (for a terminal with more than 2 possible simultaneous attachments), the end time inserted into the rejection message is the one closest in time. The new handover is thus not needlessly delayed.

With reference to FIG. 3, what is now shown is one example of the structure of a device for the multiple attachment of a mobile terminal, according to one aspect of the invention.

The attachment device 100 implements the method for the multiple attachment of a mobile terminal to access points of a plurality of access points to one or more cellular networks, various embodiments of which have just been described.

Such a device 100 may be implemented in a mobile terminal T1.

For example, the device 100 comprises a receiver 101, a transmitter 102, a processing unit 130, equipped for example with a microprocessor µP, and controlled by a computer program 110, stored in a memory 120 and implementing the attachment method according to the invention. On initialization, the code instructions of the computer program 110 are for example loaded into a RAM memory, before being executed by the processor of the processing unit 130.

Such a memory 120, such a processor of the processing unit 130, such a receiver 101 and such a transmitter 102 are able to and configured so as to:

receive an access point change command, called handover command, from one access point of the plurality, called source access point, determine a number of handovers in progress, put the received handover command on hold when a maximum number of handovers in progress is reached, this number being dependent on the maximum number of attachments, execute the received handover command when the maximum number of handovers in progress is not reached.

Advantageously, they are also able to and configured so as to:

increment or decrement a counter for counting handovers in progress, consult the counter for counting handovers in progress, for each handover in progress, estimate an expected end time and insert it into the counter, transmit a handover rejection message to the source access point, insert, into the rejection message, the expected end time of the counter that is closest in time.

To this end, the device 100 may comprise a counter 103 for counting handovers in progress.

With reference to FIG. 4, what is now shown is an example of the structure of a device for selecting an access point for the multiple attachment of a mobile terminal, according to one aspect of the invention.

The selection device 200 implements the method for selecting an access point for the multiple attachment of a mobile terminal to access points of a plurality of access points to one or more cellular networks, various embodiments of which have just been described.

Such a device 200 may be implemented in an access point to a cellular network, such as for example a base station S1.

For example, the device 200 comprises a receiver 201, a transmitter 202, a processing unit 230, equipped for example with a microprocessor µP, and controlled by a computer program 210, stored in a memory 220 and implementing the selection method according to the invention. On initialization, the code instructions of the computer program 210 are for example loaded into a RAM memory, before being executed by the processor of the processing unit 230.

Such a memory 220, such a processor of the processing unit 230, such a receiver 201 and such a transmitter 202 are able to and configured so as to:
- receive a message, called measurement report, from the terminal and containing measurements relating to radio signals transmitted by access points of the plurality,
- select an access point for the terminal from among the plurality, called target access point, at least on the basis of the received measurement report,
- transmit to the terminal an access point change command, called handover command, to hand over from the source access point to the target access point,
- receive a handover rejection message from the terminal.

Advantageously, they are also able to and configured so as to:
- delay a new handover command to the terminal, after receiving a rejection message from the terminal,
- wait for an expected end time of a handover in progress, contained in the rejection message, before transmitting a handover command to the terminal.

To this end, the device 200 may comprise a handover retarder 203.

The entities described and contained in the devices described with reference to FIGS. 3 and 4 may be hardware-based or software-based. FIGS. 3 and 4 illustrate just one particular way from among several possible ones of implementing the algorithm described above with reference to FIGS. 1 and 2. Specifically, the technique of the invention is carried out indiscriminately on a reprogrammable computing machine (a PC, a DSP processor or a microcontroller) executing a program comprising a sequence of instructions, or on a dedicated computing machine (for example a set of logic gates such as an FPGA or an ASIC, or any other hardware module).

If the invention is installed on a reprogrammable computing machine, the corresponding program (that is to say the sequence of instructions) may be stored in a removable storage medium (such as for example a floppy disk, a CD-ROM or a DVD-ROM) or a non-removable storage medium, this storage medium being able to be read partly or fully by a computer or a processor.

It will be understood that the invention makes it possible to solve the problem of loss of connectivity when a handover is requested from the terminal simultaneously for each of the attachments. Thus, even applications carried by multiple attachments to base stations and requiring very low latency or very low jitter are not affected in the event of handovers requested simultaneously by the network.

The invention claimed is:

1. A method for multiple attachment of a mobile terminal to access points of a plurality of access points of at least one cellular network, the terminal being able to be attached simultaneously to a given number of different access points, called maximum number of attachments, the method being implemented by the terminal and comprising:
- transmitting a message, called measurement report, containing measurements relating to radio signals transmitted by access points of the plurality,
- receiving an access point change command, called handover command, from an access point of the plurality, called source access point,
- putting the received handover command on hold in response to a number of handovers in progress having reached a maximum number of handovers in progress, the putting the received handover command on hold comprising either:
  - delaying execution of the received handover command until the number of handovers in progress is less than the maximum number of handovers in progress; or
  - transmitting a handover rejection message for the received handover command.

2. The method for multiple attachment as claimed in claim 1, wherein the putting on hold comprises transmitting the handover rejection message to the source access point.

3. The method for multiple attachment as claimed in claim 1, wherein:
- the receiving comprises receiving at least one handover command from at least one access point of the plurality, called the source access point;
- and the method further comprises, for each of the at least one handover commands,
  either:
  - putting the received handover command on hold in response to a number of handovers in progress having reached the maximum number of handovers in progress; or
  - executing the received handover command in response to the maximum number of handovers in progress having not been reached.

4. The method for multiple attachment as claimed in claim 3, wherein the executing comprises, at a start thereof, incrementing a counter for counting handovers in progress, and decrementing said counter at an end thereof, and wherein the determining comprises consulting said counter.

5. A method for selecting an access point for multiple attachment of a mobile terminal to access points of a plurality of access points of at least one cellular network, the method being implemented by one of the access points of the plurality, called source access point, and comprising:
- receiving a message, called measurement report, from the terminal and containing measurements relating to radio signals transmitted by access points of the plurality,
- selecting an access point for the terminal from among the plurality, called target access point, at least on the basis of the received measurement report,
- transmitting to the terminal an access point change command, called handover command, to hand over from the source access point to the target access point, and
- receiving a handover rejection message from the terminal.

6. The method as claimed in claim 5, wherein the rejection message comprises an expected end time of a handover in progress.

7. The method as claimed in claim 6, furthermore comprising delaying a new handover command to the terminal, upon receiving said rejection message from the terminal, said delaying taking account of said expected end time.

8. The method as claimed in claim 5, wherein the rejection message comprises an expected end time of a handover in progress.

9. An attachment device for multiple attachment of a mobile terminal to access points of a plurality of access points of at least one cellular network, the terminal being able to be attached simultaneously to a given number of different access points, called maximum number of attachments, the device comprising:

a receiver, a transmitter, a processor, and a memory coupled to the processor with instructions stored thereon which when executed by the processor configure the device to:

transmit a message, called measurement report, containing measurements relating to radio signals transmitted by access points of the plurality, receive an access point change command, called handover command, from an access point of the plurality, called source access point, put the received handover command on hold in response to a number of handovers in progress having reached a maximum number of handovers in progress, the putting the received handover command on hold comprising either:

delaying execution of the received handover command until the number of handovers in progress is less than the maximum number of handovers in progress; or transmitting a handover rejection message for the received handover command.

10. The attachment device as claimed in claim 9, furthermore comprising a counter for counting handovers in progress.

11. The attachment device as claimed in claim 9, wherein:

the receiving comprises receiving at least one handover command from at least one access point of the plurality, called the source access point, and wherein the instructions further configure the device to, for each of the at least one handover commands, either:

put the received handover command on hold in response to a number of handovers in progress having reached the maximum number of handovers in progress; or execute the received handover command in response to the maximum number of handovers in progress having not been reached.

12. The method for multiple attachment as claimed in claim 11, wherein:

the putting on hold comprises transmitting the handover rejection message to the source access point; and the executing comprises, at a start thereof, incrementing a counter for counting handovers in progress, and decrementing said counter at an end thereof, and wherein the determining comprises consulting said counter, and wherein the counter for counting handovers in progress comprises, for each handover in progress, an expected end time, and wherein the rejection message furthermore contains the expected end time of the counter that is the closest in time.

13. The attachment device as claimed in claim 11, wherein the executing comprises, at a start thereof, incrementing a counter for counting handovers in progress, and decrementing said counter at an end thereof, and wherein the determining comprises consulting said counter.

14. The attachment device as claimed in claim 11, wherein:

the putting on hold comprises transmitting the handover rejection message to the source access point; and the executing comprises, at a start thereof, incrementing a counter for counting handovers in progress, and decrementing said counter at an end thereof, and wherein the determining comprises consulting said counter, and wherein the counter for counting handovers in progress comprises, for each handover in progress, an expected end time, and wherein the rejection message furthermore contains the expected end time of the counter that is the closest in time.

15. The attachment device as claimed in claim 9, wherein the putting on hold comprises transmitting the handover rejection message to the source access point.

16. A selection device for selecting an access point for the multiple attachment of a mobile terminal to access points of a plurality of access points of at least one cellular network, the device comprising:

a receiver, a transmitter, a processor, and a memory coupled to the processor with instructions stored thereon which when executed by the processor configure the selection device to:

receive a message, called measurement report, from the terminal and containing measurements relating to radio signals transmitted by access points of the plurality, select an access point for the terminal from among the plurality, called target access point, at least on the basis of the received measurement report, transmit to the terminal an access point change command, called handover command, to hand over from a source access point to the target access point, and receive a handover rejection message from the terminal.

17. The selection device as claimed in claim 16, furthermore comprising a retarder for delaying a new handover command to the terminal, after receiving a rejection message from the terminal.

* * * * *